(12) United States Patent
Dunn et al.

(10) Patent No.: US 7,077,220 B2
(45) Date of Patent: Jul. 18, 2006

(54) TRACTOR WITH REAR CASTOR WHEELS

(75) Inventors: James Thomas Dunn, Winnipeg (CA);
Henry Jerome Schulz, Sanford (CA);
Leonard Bergman, Winnipeg (CA)

(73) Assignee: MacDon Industries Ltd., Winnipeg (CA)

(*) Notice: Subject to any disclaimer, the term of this patent is extended or adjusted under 35 U.S.C. 154(b) by 93 days.

(21) Appl. No.: 10/722,572

(22) Filed: Nov. 28, 2003

(65) Prior Publication Data

US 2005/0115746 A1    Jun. 2, 2005

(51) Int. Cl.
*B62D 11/04* (2006.01)

(52) U.S. Cl. ...................... 180/6.2; 16/35 D
(58) Field of Classification Search ............. 16/18 R, 16/35 R, 35 D; 56/257; 180/6.2
See application file for complete search history.

(56) References Cited

U.S. PATENT DOCUMENTS

| | | | | |
|---|---|---|---|---|
| 2,367,993 A | * | 1/1945 | Bishop | 16/35 D |
| 2,379,170 A | * | 6/1945 | McDaniel | 280/476.1 |
| 2,557,275 A | * | 6/1951 | Geisse | 244/103 R |
| 2,796,140 A | * | 6/1957 | Knolle | 414/498 |
| 3,075,233 A | * | 1/1963 | Lorenz | 16/35 R |
| 4,154,451 A | * | 5/1979 | Young | 280/86 |
| 4,209,963 A | * | 7/1980 | Linn | 56/10.8 |
| 4,320,810 A | * | 3/1982 | Hillmann et al. | 180/6.3 |
| 4,363,374 A | * | 12/1982 | Richter et al. | 180/209 |
| 5,221,100 A | * | 6/1993 | McNutt | 280/78 |
| 5,335,739 A | * | 8/1994 | Pieterse et al. | 180/6.3 |
| 6,213,218 B1 | * | 4/2001 | Miller | 172/19 |
| 6,659,491 B1 | * | 12/2003 | Green | 280/423.1 |

\* cited by examiner

*Primary Examiner*—Kevin Hurley
(74) *Attorney, Agent, or Firm*—Adrian D. Battison; Michael R. Williams; Ryan W. Dupuis

(57) ABSTRACT

A hydrostatic agricultural tractor has front ground wheels mounted on the frame at fixed angles parallel to each other and parallel to a center line of the frame and rear ground wheels mounted on a respective castor, with each of the front ground wheels being driven by a respective drive motor which allows variable speed in both the first and second directions such that steering of the tractor is effected by a differential in speed between the front wheels with the rear wheels following the steering in a castoring action. A pair of damper cylinders is provided each connected between a bracket on a rear axle of the frame and a lever in the castor plane of the castor so as to provide a damping force tending to restrict rotation of the respective second wheel about the respective vertical pivot axis with the damping force at a maximum value when the rear wheels are parallel to the center line in either the forward or reverse directions.

6 Claims, 2 Drawing Sheets

TRACTOR WITH REAR CASTOR WHEELS

This invention relates to a tractor of the type with hydraulically driven main drive wheels and trailing castor wheels.

BACKGROUND OF THE INVENTION

Hydrostatically driven tractors used primarily for swathing are commonly used and readily available. The tractor carries at a forward end on suitable sprung supports a header for cutting standing crop with the crop being transported on the header to a suitable discharge location generally centrally of the tractor performing a swath in the field from the cut crop.

Such tractors generally include a pair of front wheels just behind the header which are fixed to the frame of the tractor so that they remain at an angle parallel to each other and parallel to a center line of the tractor. The tractor is supported at the rear end by a pair of castor wheels which are attached to the frame by a conventional castor system at the ends of a rear axle so that the wheels trail behind a vertical pivot mount for the wheels and are free to swivel through 360° around the pivot amount.

The front wheels only are driven and are driven in a manner which allows full control in the forward and reverse directions so that steering is effected by a differential speed between the two front wheels with the rear wheels following in the conventional castoring action.

It is also known that such tractors can travel more effectively at high speed when reversed in direction so that the driven wheels are at the rear and the castor wheels at the front. The castor wheels of course rotate through 180° to trail behind the vertical pivot which is now forward of the castor wheels as the tractor moves at relatively high speed in this reversed direction.

Castor shimmy is an inherent problem on tractors of the above type. Recent machines have been increased in speed up to a maximum road speed of 24 mph instead of 16 which is the standard in the industry now. Speed aggravates the shimmy problem.

Loss of ground contact (going over bumps) also aggravates the problem and as a result weight is often added to prevent this. This results in increased power requirements and increased fuel consumption.

Friction devices on the swivel of the castor are often used as a common means to prevent shimmy, but they have their limitations as discussed hereinafter.

SUMMARY OF THE INVENTION

It is one object of the invention to provide an improved tractor of the above type where the tendency for castor wheel shimmy is reduced.

According to one aspect of the invention there is provided an agricultural tractor comprising:

a tractor frame arranged for attachment to an implement to be moved across the ground;

a pair of first ground wheels mounted on the frame at positions spaced transversely of the frame;

the first ground wheels being mounted on the frame at fixed angles parallel to each other and parallel to a center line of the frame;

a pair of second ground wheels mounted on the frame at positions spaced transversely of the frame each of the second ground wheels being mounted on a respective castor assembly providing, for the respective wheel:

a transverse axle of the wheel, a pivot member defining a vertical pivot axis, and a mounting link interconnecting the pivot member and the axle such that the axle is located below the pivot member and, in respect of a forward direction of movement, in a plane radial to the vertical pivot axis and rearwardly of the vertical pivot axis;

the pivot member being arranged to allow rotation of the mounting link around the pivot axis so that the tractor can move in a first direction of movement with the first wheels forward and the second wheels trailing and in a second direction of movement with the second wheels forward and the first wheels trailing;

each of the first ground wheels being driven by a respective drive motor which allows variable speed in both the first and second directions such that steering of the tractor is effected by a differential in speed between the first wheels with the second wheels following the steering in a castoring action;

and a pair of damper members each connected between the frame and a respective one of the castor assemblies so as to provide a damping force tending to restrict rotation of the respective second wheel about the respective vertical pivot axis;

the damping members being arranged such that the damping force varies at different angles around the vertical pivot axis and is at a higher value when the second wheels are parallel to the center line than when the second wheels are at right angles to the center line.

Thus one end of a shock absorber is connected to the top of the castor through an arm that is clamped to the top of the pivot shaft. The other end of the shock absorber is connected to an anchoring bracket that is attached to the stationary center member. Note that as the width of the walking beam is adjusted the anchoring bracket moves along with the adjustment. The shock absorber is most effective in the position shown and at 180 degrees from the position shown, so on the tractor that would be in both the forward and rearward travel directions.

Also, if ground contact is lost this system does not lose its effectiveness. When changing direction of travel the castor pivots around 180 degrees. When the wheel is at 90 degrees the shock absorber has no moment arm and as a result is totally ineffective. This actually works in favor of the system in that the loads to pivot the castor are not increased by the anti-shimmy feature, unlike a conventional friction device does. This friction on conventional anti-shimmy devices makes it difficult to get the castors to pivot around, particularly when the header is not attached, making the tractor light on the drive wheels and sometimes losing traction (spinning out), particularly on slippery surfaces.

With regard to the term "frame" as used herein, this may comprise a rigid frame where the wheels are attached rigidly to the frame or may include suspension arrangement between the wheels and the frame or as part of the frame structure. In a common arrangement included in the present invention, the castor wheels may be attached to a walking beam, which is pivotally attached to the frame. The walking beam has a pivot in the middle parallel to the centreline axis allowing it to rock back and forth as the machine goes over bumps thus allowing all four wheels to maintain contact with the ground.

Preferably the damping members are arranged such that the damping force is at a maximum when the second wheels are parallel to the center line.

Preferably each damping member comprises a damping cylinder having a piston rod connection at one end and a cylinder connection at an opposed end.

Preferably each damping member includes a lever which is arranged such that a mechanical advantage applied from the damping member through the lever varies as the lever pivots around the vertical pivot axis.

Preferably the lever is arranged such that it extends substantially in the plane radial of the vertical pivot axis.

Preferably the frame includes a transverse axle mounting each of the second wheels and wherein the damper member extends substantially along the axle pivotal about vertical axis through the axle.

Preferably the damper member is arranged to extend substantially along the top of the axle.

Preferably the damper member is attached to a lever at the top of the pivot member.

Preferably the damper member has one end attached to a bracket bolted to the axle.

According to a second aspect of the invention there is provided an agricultural tractor comprising:

a tractor frame arranged for attachment to an implement to be moved across the ground;

a pair of first ground wheels mounted on the frame at positions spaced transversely of the frame;

the first ground wheels being mounted on the frame at fixed angles parallel to each other and parallel to a center line of the frame;

a pair of second ground wheels mounted on the frame at positions spaced transversely of the frame;

each of the second ground wheels being mounted on a respective castor assembly providing, for the respective wheel:

a transverse axle of the wheel, a pivot member defining a vertical pivot axis, and a mounting link interconnecting the pivot member and the axle such that the axle is located below the pivot member and, in respect of a forward direction of movement, in a plane radial to the vertical pivot axis and rearwardly of the vertical pivot axis;

the pivot member being arranged to allow rotation of the mounting link around the pivot axis so that the tractor can move in a first direction of movement with the first wheels forward and the second wheels trailing and in a second direction of movement with the second wheels forward and the first wheels trailing;

each of the first ground wheels being driven by a respective drive motor which allows variable speed in both the first and second directions such that steering of the tractor is effected by a differential in speed between the first wheels with the second wheels following the steering in a castoring action;

and a pair of elongate damper cylinders each connected between the frame and a respective one of the castor assemblies at a position thereon spaced from the vertical pivot axis so as to provide a damping force tending to restrict rotation of the respective second wheel about the respective vertical pivot axis.

According to a third aspect of the invention there is provided an agricultural tractor comprising:

a tractor frame arranged for attachment to an implement to be moved across the ground;

a pair of first ground wheels mounted on the frame at positions spaced transversely of the frame;

the first ground wheels being mounted on the frame at fixed angles parallel to each other and parallel to a center line of the frame;

a pair of second ground wheels mounted on the frame at positions spaced transversely of the frame;

each of the second ground wheels being mounted on a respective castor assembly providing, for the respective wheel:

a transverse axle of the wheel, a pivot member defining a vertical pivot axis, and a mounting link interconnecting the pivot member and the axle such that the axle is located below the pivot member and, in respect of a forward direction of movement, in a plane radial to the vertical pivot axis and rearwardly of the vertical pivot axis;

the pivot member being arranged to allow rotation of the mounting link around the pivot axis so that the tractor can move in a first direction of movement with the first wheels forward and the second wheels trailing and in a second direction of movement with the second wheels forward and the first wheels trailing;

each of the first ground wheels being driven by a respective drive motor which allows variable speed in both the first and second directions such that steering of the tractor is effected by a differential in speed between the first wheels with the second wheels following the steering in a castoring action;

and a pair of damper cylinders each connected between the frame and a lever at a respective one of the castor assemblies so as to provide a damping force tending to restrict rotation of the respective second wheel about the respective vertical pivot axis;

the damping members and the levers being arranged such that the damping force varies at different angles around the vertical pivot axis due to changes in mechanical advantage as the lever pivots around the vertical pivot axis and is at a maximum value when the second wheels are parallel to the center line.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
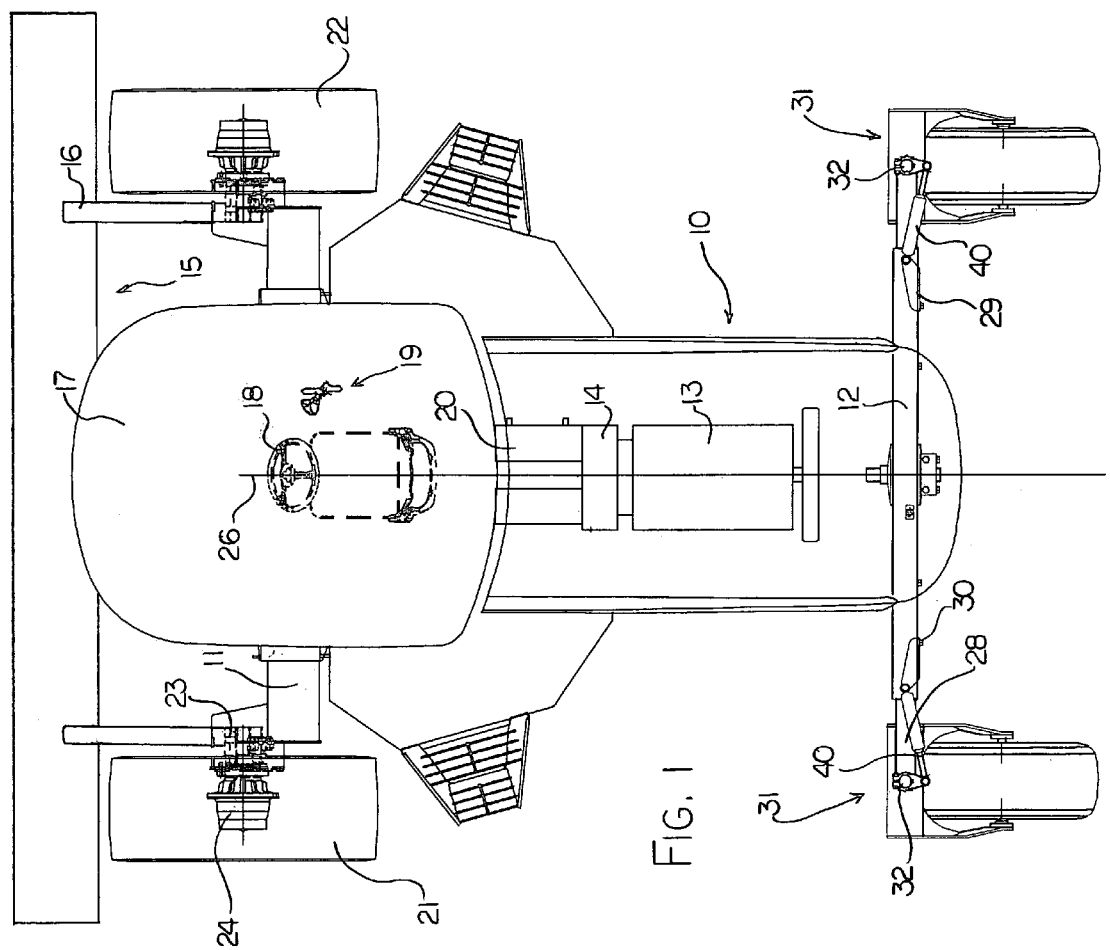
FIG. 1 is a top plan view showing schematically a hydrostatically driven and steered tractor of the type with which the present invention is concerned including the damper member of the present invention.

In FIG. 1 is shown a tractor of the above type which includes a damping system according to the present invention. The tractor is shown schematically but generally includes a frame 10 with a front axle 11 and a rear axle 12. On the frame 10 is mounted a motor 13 driving a gear box and pump assembly schematically indicated at 14 for communicating hydraulic drive fluid to the various components of the tractor for propelling the tractor and for driving an implement 15 mounted on the tractor. In one example, the engine drives a gearbox at the rear of the engine that splits the power to two pump assemblies. One pump assembly has two pumps (one for each wheel) for traction drive & each pump controls one wheel. The other pump assembly has four pumps (two for header drive, one for lift functions and one providing supercharge oil). In the embodiment shown the implement is a header arranged for cutting a standing crop with the header carried on support arms 16 mounted on the tractor at the forward end in conventional manner. The tractor includes a cab 17 including steering 18 and control elements 19 operable by the driver with those control elements and steering acting to communicate control movements to a fluid control system generally indicated at 20 which supplies the fluid to the various elements to be driven.

The tractor includes first wheels 21 and 22 mounted on legs 23 extending downwardly from the front axle 11. Each leg carries a drive motor 24 for providing drive power to the respective wheel 21, 22 in response to the supply of hydraulic fluid from the control unit 20. The wheels 21 and 22 are mounted on hubs attached to the motors 24 so that the wheels are supported at a fixed angle to the frame so as to be parallel to each other and parallel to a center line 26 of the tractor. Thus the tractor is not steered by pivotal movements of the wheels which are fixed.

The rear axle 12 carries adjustable portions 28 and 29 which can be moved inwardly and outwardly and locked by connecting bolts 30 at a required spacing from the center line 26 thus allowing adjustment of the track of the vehicle. At the outer end of each portion 28, 29 is mounted a respective castor wheel 31 which can swivel around a vertical pivot member 32 of the castor. Thus the wheels on the axle 12 are castor wheels which are again not steered but merely free to rotate around the vertical axis defined by the pivot 32.

Tractors of this type are well known and are highly manoeuvrable since the steering is effected by differential speed or differential rotation of the wheels 21 and 22 with the castor wheels 31 merely following the steering action as required.

It is well known that such tractors are generally used with the driven wheels 21 and 22 forward so that the implement is in front of those wheels.

However for high speed movement the vehicle is driven in the opposite direction so that the driven wheels 21 and 22 are at the rear and the castor wheels are at the front. This is known to provide an improved stability of the tractor at higher transport speeds and may provide an improved arrangement for transporting the implement which not in use.

Each of the castor wheels 31 includes a damper 40 which connects between the castor wheel and the extendable portion 28, 29 of the tractor so as to prevent or reduce castor wheel shimmy as described herein before.

Figure 2:
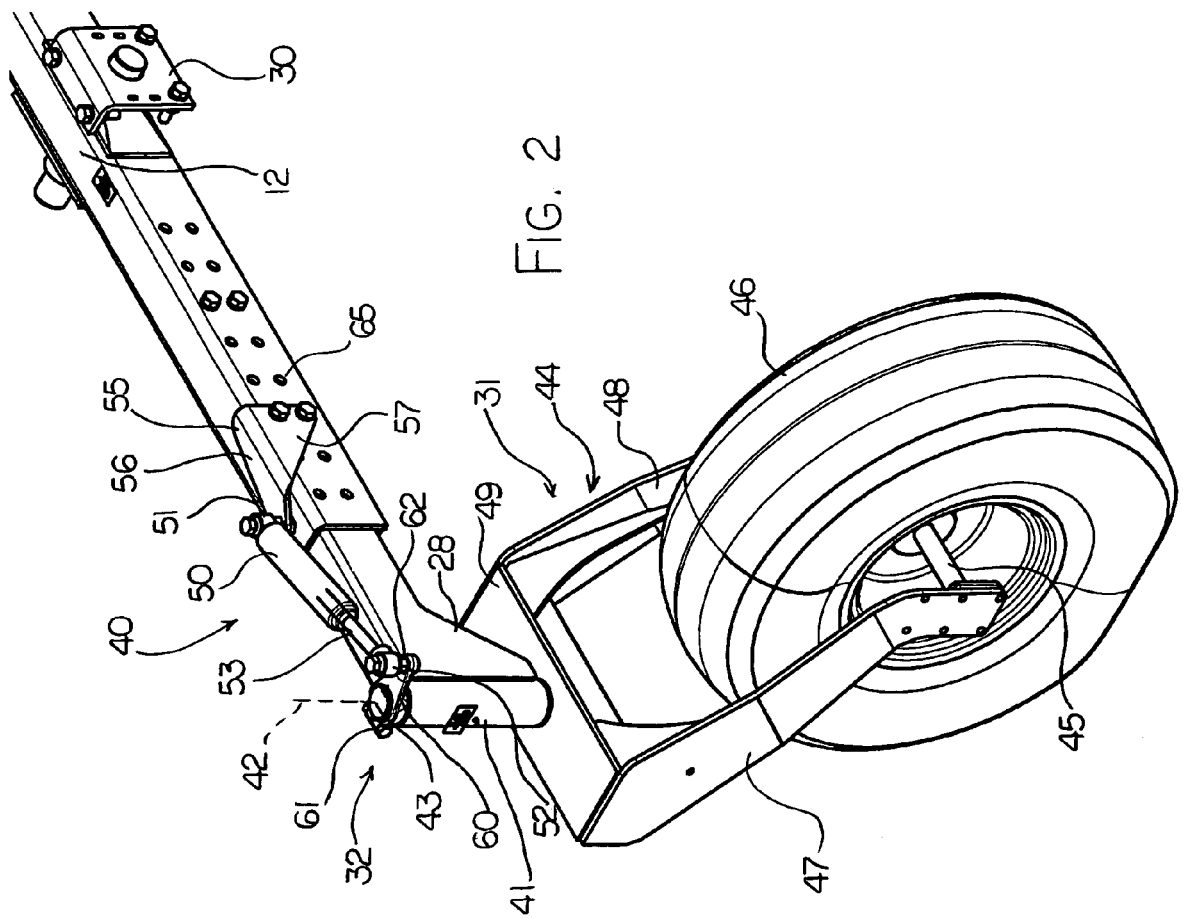
FIG. 2 is an isometric view of the damper and rear castor of the tractor of FIG. 1.

Turning now to FIG. 2, the damper 40 is shown in more detail with further detail of the castor wheel 31 and the axle 12.

Thus as shown in FIG. 2, at the end of the axle 12 is mounted the extendable portion 28 which is fixed in place by bolts 30. The extendable portion 28 carries a sleeve 41 which defines a vertical pivot axis 42 of the swivel mounting 32. Within the sleeve 41 is mounted a pin 43 with the lower end of the pin attached to a castor link 44 carrying an axle 45 of the wheel 46. The link 44 is of a conventional arrangement providing two arms 47 and 48 extending from a top mounting 49 with each of the arms carrying a respective end of the axle 45. Thus the axle is located downwardly from the pivot mounting 32 and the axle is arranged rearwardly of the pivot axis 42 so that the castor wheel tends to trail behind the axis 42 as the vehicle moves. The assembly illustration shows a forked caster as described. An alternative arrangement (not shown) may use a formed caster. In the case of the formed caster the pivot shaft extends to a position below the supporting plate and is formed to get around one side of the tire. The axle is welded on and cantilevers out, that is it is not supported on the other side.

The damper 40 comprises a shock absorber cylinder or damping cylinder 50 with a rear coupling 51 at one end of the cylinder and a front coupling 52 at the outer end of the piston rod 53. Shock absorbers of this type are readily available and provide suitable damping forces while allowing the piston to slide within the cylinder against the resistance provided by the fluid within the cylinder. The rear coupling 51 is mounted on a bracket 55 having a horizontal support wall 56 and a vertical attachment wall 57 bolted to the side of the axle 12. Thus the horizontal mounting section 56 of the bracket defines a vertical post receiving the rear coupling 51 and allowing the rear end of the cylinder to pivot about the vertical axis defined by the vertical post. The opposite end 52 of the shock absorber 50 is attached to a lever 60 carried on the upper end of the pin 43 and rigidly attached thereto by a clamp, where the clamp is integral to the arm 61. The lever thus is arranged in a horizontal plane at the top of the pin 43 and also extends outwardly from the axis 42 in a radial direction therefrom within that horizontal plane. The lever is located so that a radius extending from the axis 42 and connecting to the link 52 extends along a center plane of the castor assembly so that the link also follows with the castor wheel and lies in the castor plane of the castor wheel that is a center plane parallel to the side arms 47 and 48 and at right angles to the axle 45. To carry the load and ensure proper orientation, there is a key slot in the caster shaft and the arm and a square cross-section key is installed. The link 52 is mounted on a bolt 62 standing vertically upwardly from the lever 60 again allowing pivotal movement of the link 52 relative to the post and relative to the lever. The position of the bracket 55 is arranged so that the shock absorber is approximately at its center position when the castor plane defined by the castor wheel extends at right angles to the axle 12 that is longitudinally of the vehicle and parallel to the center line 26 of the vehicle. The bracket 55 can be moved along the axle 12 by selecting for mounting of the bracket respective pairs of holes 65 at spaced positions along the axle 12. Thus as the extension portion 28 is moved outwardly, the bracket is also disconnected and moved so that its relative position to the lever remains unchanged.

The shock absorber 50 thus extends from the inner end lying on an axis extending vertically through the axle at an inclined direction to the longitudinal direction of the axle to the outer end of the lever 60. It will be appreciated that the fore/aft distance, although the radial distance does not change, of the coupling 52 from the axis 42 is at a maximum when the lever is at right angles to the axle 12. As the lever is rotated around the axis 42 through an angle which approaches 90°, the distance of the coupling from the center plane of the axle decreases thus decreasing the mechanical advantage of the lever. At the 90° position relative to the position as shown in FIG. 2, the shock absorber has no effect since the shock absorber is acting at right angles to the direction of movement and thus has zero effect at the 90° angle with the effect increasing as the angle changes from 90°.

Thus the shock absorber effect of the resistance force applied by the shock absorber to the movement of the castor wheel is at the maximum in the position shown in FIG. 2 and in a position 180° spacing from the position shown in FIG. 2. The force is at a minimum when the lever is at right angles to the position shown in FIG. 2 either extending toward the axle 12 or away from the axle 12. Thus the shock absorber in force varies through the rotation and is at maximum at positions where the force is primarily required, that is when the castor wheel is in its normal operating position with the vehicle moving in the implement forward direction or in the implement trailing transport direction.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An agricultural tractor comprising:
    a tractor frame for movement in a direction of forward working movement of the tractor across a field;
    the tractor frame having support members at a forward end of the frame, in respect of the direction of working movement, arranged for attachment to an implement to be moved across the ground with the implement supported across and in front of the forward end;
    a pair of first ground wheels mounted on the frame at the forward end of the frame at positions spaced transversely of the frame;
    the first ground wheels being mounted on the frame at fixed angles parallel to each other and parallel to a center line of the frame;
    a pair of second ground wheels mounted on the frame at a rearward end of the frame at positions spaced transversely of the frame;
    each of the second ground wheels being mounted on a respective castor assembly providing, for the respective wheel:
        a transverse axle of the wheel,
        a pivot member defining a vertical pivot axis,
        and a mounting link interconnecting the pivot member and the axle such that the axle is located below the pivot member and, in respect of the forward direction of movement, in a plane radial to the vertical pivot axis and rearwardly of the vertical pivot axis;
        the pivot member being arranged to allow rotation of the mounting link around the pivot axis so that the tractor can move in the direction of forward working movement with the first wheels forward and the second wheels trailing and in a second direction of movement opposite to the direction of forward working movement with the second wheels forward and the first wheels trailing;
    each of the first ground wheels being driven by a respective drive motor which allows variable speed in both the first and second directions such that steering of the tractor is effected by a differential in speed between the first wheels with the second wheels following the steering in a castoring action;
    and a pair of damper cylinders each connected between the frame and a respective one of a pair of levers where each lever is arranged at a respective one of the castor assemblies so as to provide a damping force tending to restrict rotation of the respective second wheel about the respective vertical pivot axis;
    the damper cylinders and the levers being arranged such that the damping force for each castor assembly varies at different angles around the vertical pivot axis due to changes in mechanical advantage as the lever pivots around the vertical pivot axis and is at a maximum value when the second wheels are parallel to the center line and the tractor is moving in the direction of forward working movement and is at a maximum value when the second wheels are parallel to the center line and the tractor is moving in the opposite direction.

2. The tractor according to claim 1 wherein the frame includes a transverse axle mounting each of the second wheels and wherein the each damper cylinder extends substantially along the axle pivotal about a vertical axis through the axle.

3. The tractor according to claim 2 wherein each damper cylinder is arranged to extend substantially along the top of the axle and the respective lever is arranged at the top of the pivot member.

4. The tractor according to claim 3 wherein each damper cylinder has one end attached to a bracket bolted to the axle.

5. An agricultural tractor comprising:
    a tractor frame for movement in a direction of forward working movement of the tractor across a field;
    the tractor frame having support members at a forward end of the frame, in respect of the direction of working movement, arranged for attachment to an implement to be moved across the ground with the implement supported across and in front of the forward end;
    a pair of first ground wheels mounted on the frame at the forward end of the frame at positions spaced transversely of the frame;
    the first ground wheels being mounted on the frame at fixed angles parallel to each other and parallel to a center line of the frame;
    a pair of second ground wheels mounted on the frame at a rearward end of the frame at positions spaced transversely of the frame;
    each of the second ground wheels being mounted on a respective castor assembly providing, for the respective wheel:
        a transverse axle of the wheel,
        a pivot member defining a vertical pivot axis,
        and a mounting link interconnecting the pivot member and the axle such that the axle is located below the pivot member and, in respect of a the forward direction of movement, in a plane radial to the vertical pivot axis and rearwardly of the vertical pivot axis;
        the pivot member being arranged to allow rotation of the mounting link around the pivot axis so that the tractor can move in the direction of forward working movement with the first wheels forward and the second wheels trailing and in a second direction of movement opposite to the direction of forward working movement with the second wheels forward and the first wheels trailing;
    each of the first ground wheels being driven by a respective drive motor which allows variable speed in bath the first and second directions such that steering of the tractor is effected by a differential in speed between the first wheels with the second wheels following the steering in a castoring action;
    and a pair of damper cylinders each connected between the frame and a respective one of a pair of levers where each lever is arranged at a respective one of the castor assemblies so as to provide a damping force tending to restrict rotation of the respective second wheel about the respective vertical pivot axis;
    the damper cylinders and the levers being arranged such that the damping force for each castor assembly varies at different angles around the vertical pivot axis due to changes in mechanical advantage as the lever pivots around the vertical pivot axis and is at a maximum value when the second wheels are parallel to the center line and the tractor is moving in the direction of forward working movement and is at a maximum value when the second wheels are parallel to the center line and the tractor is moving in the opposite direction;

the frame including a rear axle on which the second ground wheels are mounted;

the rear axle including a center portion and two adjustment portions on which the second ground wheels are mounted with the adjustment portions being adjustable relative to the center portion to change spacing between the second ground wheels;

each of the damper cylinders being attached to a bracket which is carried on the center portion of the rear axle and is movable relative thereto to accommodate adjustment of the respective adjustment portion.

6. The tractor according to claim 5 wherein each bracket has a vertical portion bolted to a side of the center portion of the rear axle and a horizontal flange portion extending over a top of the center portion of the rear axle so as to support an end of the damper cylinder on tap of the rear axle.

* * * * *